United States Patent
Döbele et al.

(10) Patent No.: US 6,445,991 B1
(45) Date of Patent: Sep. 3, 2002

(54) METHOD FOR CONTROLLING DISENGAGEABLE CLUTCHES FOR STARTING AND FOR SHIFTING VARIABLE-SPEED GEARS IN AUTOMOBILES

(75) Inventors: Bernd Döbele, Salem; Norbert Wiencek, Hagnau, both of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/601,756

(22) PCT Filed: Feb. 26, 1999

(86) PCT No.: PCT/EP99/01259
§ 371 (c)(1),
(2), (4) Date: Aug. 7, 2000

(87) PCT Pub. No.: WO99/45290
PCT Pub. Date: Sep. 10, 1999

(30) Foreign Application Priority Data

Mar. 4, 1998 (DE) ................................ 198 09 060

(51) Int. Cl.$^7$ ................................................ G06F 7/00
(52) U.S. Cl. .................... 701/67; 192/3.51; 477/86
(58) Field of Search .............. 701/67, 68; 192/3.51; 477/86

(56) References Cited

U.S. PATENT DOCUMENTS 4,081,065 A  3/1978 Smyth et al. ................ 192/76

FOREIGN PATENT DOCUMENTS

| DE | 2 207 571 | * | 9/1972 |
| DE | 27 00 821 C2 | * | 7/1978 |
| DE | 32 16 244 A1 | * | 2/1983 |
| DE | 36 13 606 A1 | * | 11/1986 |
| EP | 0 189 050 A1 | * | 7/1986 |
| EP | 0 228 544 A1 | * | 7/1987 |
| EP | 0 536 932 A2 | * | 4/1993 |
| EP | 0 658 698 A2 | * | 6/1995 |
| EP | 0 668 453 A1 | * | 8/1995 |

* cited by examiner

*Primary Examiner*—Yonel Beaulieu
(74) *Attorney, Agent, or Firm*—Davis & Bujold, P.L.L.C.

(57) ABSTRACT

Control of shiftable clutches by a clutch control signal that is a function of the difference between the actual and desired engine rotational speeds and of the gradient of the actual engine rotational speed and wherein the clutch control signal values are generated by the employment of a set of clutch engagement and disengagement speed curves.

8 Claims, 2 Drawing Sheets

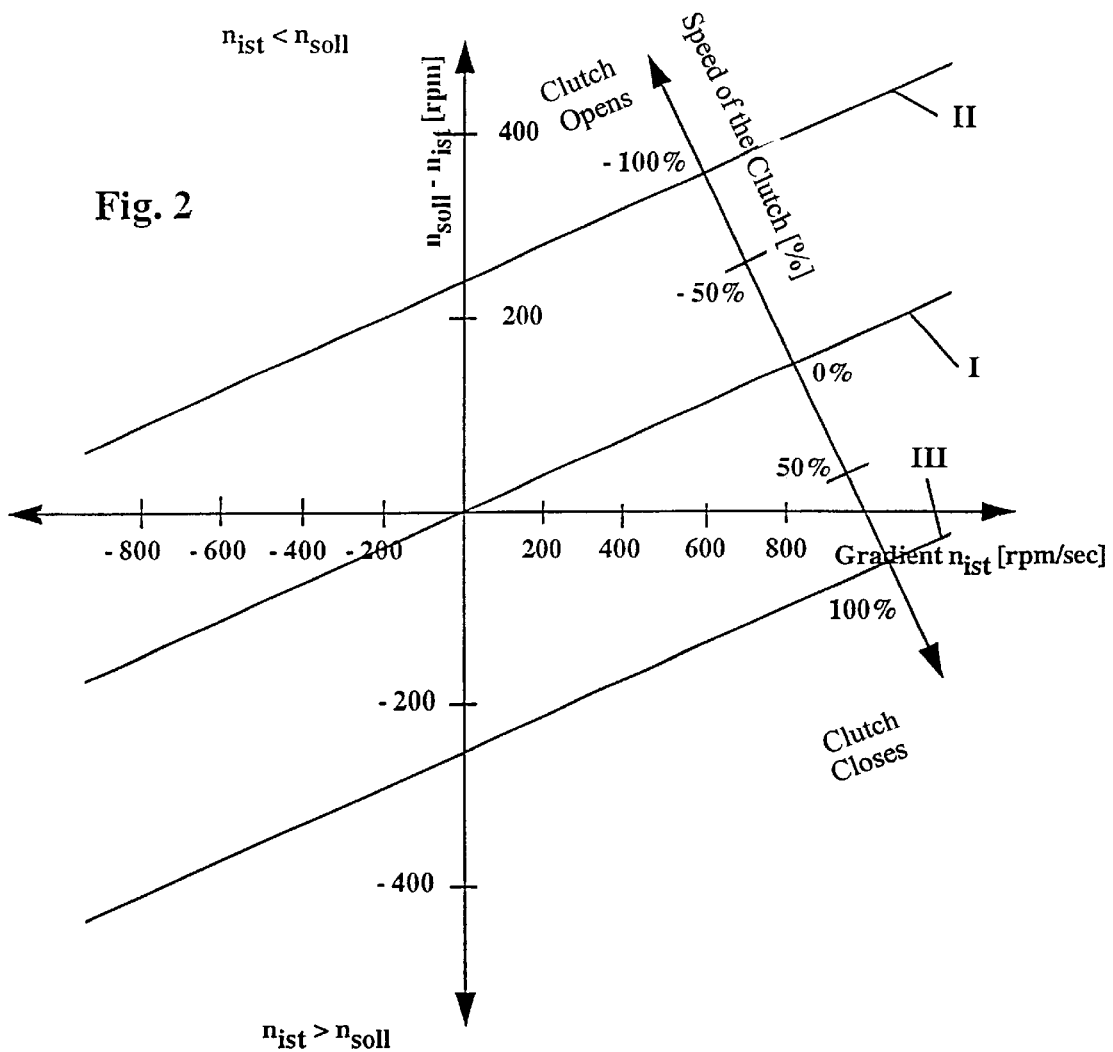

METHOD FOR CONTROLLING DISENGAGEABLE CLUTCHES FOR STARTING AND FOR SHIFTING VARIABLE-SPEED GEARS IN AUTOMOBILES

The invention relates to a method for control of shiftable clutches for shifting gears in automobiles.

When connecting a variable-speed gear with the output shaft of an internal combustion engine, the regulation of the speed at which the clutch is engaged constitutes a problem. If the clutch is engaged too quickly, there is the danger that the clutch plates and also other parts in the gear and input traction will be damaged.

BACKGROUND OF THE INVENTION

In EP 0 228 544 is disclosed a method for the control of clutch-control systems, such as mentioned above, in which a comparator compares the actual rotational speed of the engine with a desired rotational speed. The corresponding output signal, which indicates the difference between the desired rotational speed and the actual rotational speed, is plotted in a summing element and on a differential element which from the difference produces the temporary change of the difference and plots it on the summing element. The sum resulting from difference and temporary change of the difference is plotted in a clutch regulator for control of the separating clutch.

The problem on which this invention is based consists in providing a method with which the shiftable clutches are better controlled for the purpose of starting and shifting variable-speed gears of automobiles.

SUMMARY OF THE INVENTION

With the aid of the instant invention power-shiftable gears having wet clutches can be regulated to a constant slip time, the PI regulating algorithms having simple dependences. In this invention, it is advantageously possible to eliminate the use of PI regulating algorithms. This invention can be used specially in relation with the actuation of clutches and motor vehicles for the purpose of starting and changing gears in stepped transmissions having manual gear shift control (so-called semiautomatic) and in automated gear shifts.

BRIEF DESCRIPTION OF THE DRAWINGS

The invention and embodiments are described in detail below with the aid of figures, in which:

FIG. 2 is a diagram for explaining the calculation of the coupling and uncoupling speed of a clutch according to engine rotational speed gradient and differential rotational speed.

DESCRIPTION OF THE PREFERRED EMBODIMENTS

Figure 1:
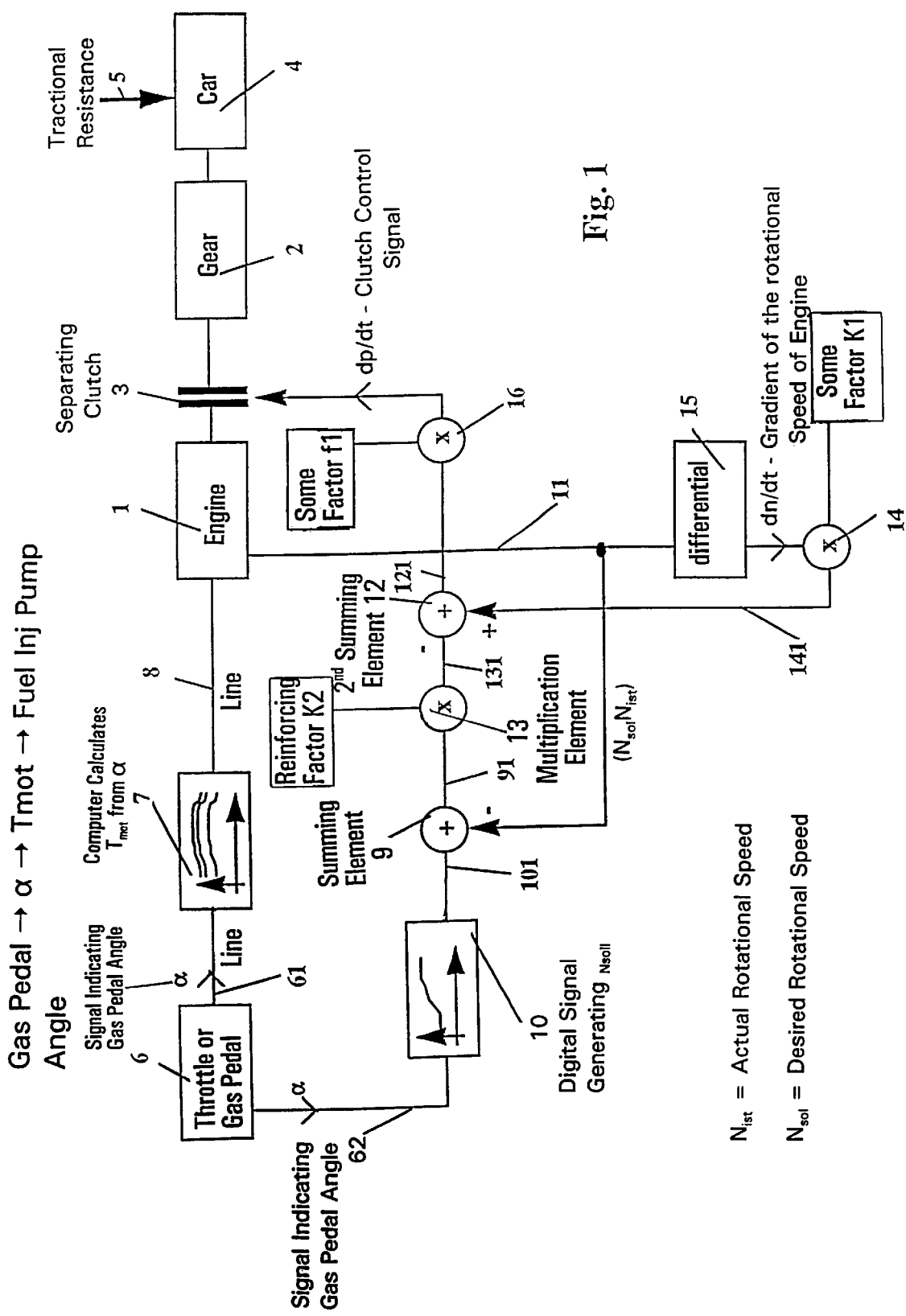
FIG. 1 is the block gear shift diagram of a preferred starting and gear shifting device.

In FIG. 1, the engine of a motor vehicle 4 is designated with 1. The separating clutch that connects the output shaft of the engine 1 with the gear 2 is designated with 3. The gear 2 acts upon the input gears of the motor vehicle 4. The tractional resistance, acting upon the motor vehicle 4, is diagrammatically shown by the arrow 5.

The throttle or accelerator pedal of the vehicle 4 is designated with 6. Via an electronic transmitter (not shown) there is produced on the outputs of the accelerator pedal 6 an electric signal α which indicates the accelerator pedal angle of the throttle pedal. By a computer 7 in which the signal α is plotted via a line 61, there is calculated from the signal α a signal $T_{mot}$ on a line 8 which leads to the engine 1 and by which the signal $T_{mot}$ corresponding to the accelerator angle α is plotted to actuate the fuel injection pump of the engine 1. For this purpose, the computer unit contains dependences of all possible accelerator pedal angles α of the accelerator pedal 6 and corresponding signals $T_{mot}$ for the injection pump.

Corresponding to the actual rotational speed $n_{ist}$ of the engine 1, a signal is produced on a line 11 by a rotational speed sensor (not shown in detail). The signal is plotted in the summing element 9 in which is also plotted a signal corresponding to the desired rotational speed $n_{soll}$, which signal generates from a digital unit 10 where the signal α corresponding to the accelerator pedal angle of the vehicle pedal 6 is converted, based on stored tables and functions, to the set rotational speed $n_{soll}$. The signal α is plotted via the line 62 on the digital unit 10 which is connected via the line 101 with the summing element 9.

The summing element 9 produces on its output 91 a differential rotational speed signal $n_{soll}-n_{ist}$ which is multiplied by a reinforcing factor K2 in a multiplication element 13. The output signal of the multiplication element 13 is plotted via the line 131 on one other summing element 12 and is there added up with a signal dn/dt which indicates the gradient of the rotational speed of the engine. The signal dn/dt is produced from the rotational speed signal $n_{ist}$ which abuts on the line 11 and is plotted on a differential element 15. The signal dn/dt produced on the output of the differential element 15 is preferably multiplied by a factor K1 in a multiplication element 14 and thereafter plotted on the summing element 12 via the line 141.

On the output (line 121) of the summing element 12 then abuts a signal which comprises both the gradient dn/dt of the engine rotational speed $n_{ist}$ and the difference between the rotational speeds $n_{soll}$ and $n_{ist}$. From said signal α control signal dp/dt for the separating clutch 3 is produced in a multiplication element 16 by multiplying by a factor fl.

FIG. 2 shows a diagram of the dependence of the difference between set rotational speed $n_{soll}$ and actual rotational speed $n_{ist}$ of the engine 1 from the gradient dn/dt of the engine rotational speed for calculating the coupling and uncoupling speed of the separating clutch 3.

The speed of the engagement and disengagement of the separating clutch 3 is here determined in the diagram of FIG. 2 in the form of linear curves I, II, Ill determined by the difference between set rotational speed $n_{soll}$ and engine rotational speed $n_{ist}$ and the gradient dn/dt, which curves indicate in percent numbers the speed of engagement and disengagement of the clutch 3. The curves I, II, III are preferably straight lines that extend parallel to each other and diagonally in relation to the axis of the gradient, each line corresponding to a specific speed of the engagement and disengagement of the separating clutch 3. Therefore, a computer can calculate respectively from a value of the mentioned difference and a value of the mentioned gradient the speed for engagement and disengagement.

Different operations are explained in detail below.

When starting, the coupling operation begins when a defined threshold of the rotational speed of the accelerator pedal angle a has been exceeded. Each accelerator pedal angle a corresponds to a set rotational speed $n_{soll}$ of the engine 1 and therewith to the primary rotational speed of the separating clutch 3 on which the starting operation develops.

From the formal dependence of the difference $n_{soll}-n_{ist}$ and of the gradient dn/dt of the primary rotational speed on the separating clutch 3, there is calculated the speed of the engaging movement which leads to a constant course of the primary rotational speed on the separating clutch 3. The time until the torque balance is reached on the separating clutch 3 is here constant, that is, independent of the output state. As fixed parameter is required only the inertia moment of the driving side and a conversion factor to convert the torque increase on the separating clutch 3 to a coupling speed. The above mentioned time can also be programmed variable such as dependent on the accelerator pedal angle. Advantageously no expensive regulating algorithm is required. The coupling speed is iteratively calculated within a fixed time screen.

When opening the separating clutch 3 for gear change, depending on the momentary magnitude of the torque in the drive train, the filling of the separating clutch 3 before it opens is reduced. A factor formed from the ratio of a reference acceleration of the vehicle to the actual acceleration corrects the filling recirculation depending on the power excess. After expiration of the load-reducing phase, the separating clutch 3 opens in rapid movement. The clear signal for the gear change is indicated from the moment a defined travel position of the separating clutch 3 is exceeded.

When closing the separating clutch 3 after a gear change, the closing operation starts with the information of the terminated gear change. After reaching an engagement degree dependent on the accelerator pedal angle which is started at maximum speed, the regulated coupling operation begins. Corresponding to the "start" operation, the closing speed is calculated from the gradient dn/dt of the primary rotational speed and the amount of the difference between $n_{soll}$ and $n_{ist}$. The set value is the secondary rotational speed of the clutch. The engine torque is increased according to a dependence of the transmitted torque as function of the clutch path. As added limitation of the clutch load, the engine torque is limited according to the difference between primary and secondary rotational speeds on the separating clutch 3. Thereby it is not possible, e.g. an "overspeeding" of the clutch due to drop of friction value such as can occur by oiling up etc., for the engine 1 has been backed up.

The regulated closing operation terminates when the synchronous rotational speed has been reached on the separating clutch 3. It is of the essence here that the time up to reaching the synchronous speed, which is also designated as slip time, be constant and within certain limits independently of the friction value fluctuations and friction lining materials.

After uniformity between the primary and the secondary rotational speeds has been reached, the separating clutch 3 is fully closed at a constant speed dependent on the acceleration pedal angle. The increase of the bevel of the adjusting device for measuring the fuel up to the value corresponding to the position of the accelerator pedal, remains coupled to the clutch path until full closure.

Reference Numerals

1 engine
2 gear
3 separating clutch
4 motor vehicle
5 arrow (tractional resistance)
6 accelerator pedal
7 computer
8 line
9 summing element
10 digital unit
11 line
12 summing element
13 multiplication element
14 multiplication element
15 differential element
16 multiplication element
61 line
62 line
91 output
101 line
121 line
131 line
141 line

What is claimed is:

1. A method of controlling a shiftable separating clutch (3) for the purpose of starting and shifting variable-speed gears (2) of a motor vehicle (4) comprising the steps of:

delivering an actual rotational speed signal ($n_{ist}$) from an engine (1) to a differential element (15) and a first summing element (9), the actual rotational speed signal ($n_{ist}$) sent to the differential element being used to calculate a gradient of the engine rotational speed (dn/dt), the engine rotational speed (dn/dt) being sent to a second summing element (12);

delivering an electric signal ($\alpha$) from a throttle (6) to a fuel injection pump and a digital unit (10), the digital unit (10) converts the electric signal ($\alpha$) to a desired rotational speed signal ($n_{soll}$), the desired rotational speed signal ($n_{soll}$) is sent to the first summing element (9);

calculating a differential signal ($n_{soll}-n_{ist}$) by summing in the first summing element (9), the desired rotational speed signal ($n_{soll}$) and the gradient of the engine rotational speed (dn/dt), the differential signal ($n_{soll}-n_{ist}$) being sent to a second summing element (12);

calculating a clutch control signal (dp/dt) in the second summing element (12) from the differential signal ($n_{soll}-n_{ist}$) and the gradient of the engine rotational speed (dn/dt); and clutch control signal (dp/dt); and using the clutch control signal (dp/dt) to control the speed of engagement and disengagement of the separating clutch (3).

2. The method according to claim 1, further comprising the step of multiplying in a first multiplication element (13) said differential signal ($n_{soll}-n_{ist}$) by a first factor (K2), said first multiplication element (13) being rear-mounted in a second summing element (12).

3. The method according to claim 1, further comprising the step of multiplying in a second multiplication element (16) rear-mounted on said first summing element (9), the clutch control signal (dp/dt) by a second factor (fl).

4. The method according to claim 1, further comprising the step of multiplying in a third multiplication element (14) rear-mounted on said differential element (15), the gradient of the engine rotational speed (dn/dt) by a third factor (K1).

5. A method of controlling a shiftable separating clutch (3) for the purpose of starting and shifting variable-speed gears (2) of a motor vehicle (4) comprising the steps of:

delivering an actual rotational speed signal ($n_{ist}$) from an engine (1) to a differential element (15) and a second summing element (12), the actual rotational speed signal ($n_{ist}$) sent to the differential element being used to calculate a gradient of the engine rotational speed (dn/dt), the engine rotational speed (dn/dt) being sent to a second summing element (12);

delivering an electric signal ($\alpha$) from a throttle (6) to a fuel injection pump and a digital unit (10), the digital unit (10) converts the electric signal (α) to a desired rotational speed signal ($n_{soll}$), the desired rotational speed signal ($n_{ist}$) is sent to the first summing element (9);

calculating a differential signal ($n_{soll}$–$n_{ist}$) by summing in the first summing element (9), the desired rotational speed signal ($n_{soll}$) and the gradient of the engine rotational speed (dn/dt), the differential signal ($n_{soll}$–$n_{ist}$) being sent to a second summing element (12); and calculating in a computer, a clutch control signal (dp/dt) from the differential signal ($n_{soll}$–$n_{ist}$) and the gradient of the engine rotational speed (dn/dt), for controlling the speed of the engagement and disengagement of the separating clutch (3), the clutch control signal (dp/dt) being stored in the computer, depending on a difference between the desired rotational speed signal ($n_{soll}$) and the actual rotational speed signal ($n_{ist}$), the same as on the gradient of the engine rotational speed (dn/dt), the computer also storing a curve (I, II, III) as function of the difference between the desired rotational speed signal ($n_{soll}$) and the actual rotational speed signal ($n_{ist}$), the same as on the gradient of the engine rotational speed (dn/dt).

6. The method according to claim 5, further comprising the step of multiplying in a first multiplication element (13) said differential signal ($n_{soll}$–$n_{ist}$) by a first factor (K2), said first multiplication element (13) being rear-mounted in a second summing element (12).

7. The method according to claim 5, further comprising the step of multiplying in a second multiplication element (16) rear-mounted on said first summing element (9), the clutch control signal (dp/dt) by a second fractor (fl).

8. The method according to claim 5, further comprising the step of multiplying in a third multiplication element (14) rear-mounted on said differential element (15), the gradient of the engine rotational speed (dn/dt) by a third factor (K1).

* * * * *